United States Patent [19]

Gray

[11] Patent Number: 5,589,066

[45] Date of Patent: Dec. 31, 1996

[54] PORTABLE WATER PURIFICATION SYSTEM

[75] Inventor: Buddy D. Gray, Dellrose, Tenn.

[73] Assignee: Teledyne Industries, Inc., Los Angeles, Calif.

[21] Appl. No.: 277,316

[22] Filed: Jul. 22, 1994

Related U.S. Application Data

[62] Division of Ser. No. 120,400, Sep. 14, 1993, Pat. No. 5,496,466.

[51] Int. Cl.⁶ ................................................. B01D 36/00
[52] U.S. Cl. .................... 210/258; 210/259; 210/266; 210/416.3
[58] Field of Search ................................ 210/257.2, 258, 210/259, 416.1, 416.3, 266, 806

[56] References Cited

U.S. PATENT DOCUMENTS

| | | | |
|---|---|---|---|
| 4,187,173 | 2/1980 | Keefer | 210/416.1 |
| 4,913,809 | 4/1990 | Sawada et al. | 210/257.2 |
| 5,004,535 | 4/1991 | Bosko et al. | 210/257.2 |
| 5,059,317 | 10/1991 | Marius et al. | 210/257.2 |
| 5,174,901 | 12/1992 | Smith | 210/257.2 |
| 5,193,988 | 3/1993 | Solomon | 210/416.1 |

Primary Examiner—Joseph W. Drodge
Attorney, Agent, or Firm—Dickstein Shapiro & Morin L.L.P.

[57] ABSTRACT

A portable water purification system has a prefiler, a pumping unit, a reverse osmosis unit, a microbial control unit and a post filter for removing nuclear, biological, chemical and other contaminants from a water source. The hand operated pumping unit has a feed water cylinder and a concentrate cylinder to control ratios between intake and concentrate volumes. The system further prolongs the life of components by reducing the level of contaminants in contact with parts of the system.

4 Claims, 1 Drawing Sheet

5,589,066

PORTABLE WATER PURIFICATION SYSTEM

This application is a division of application Ser. No. 8/120,400, filed Sep. 14, 1993 now U.S. Pat. No. 5,496,466.

FIELD OF THE INVENTION

The present invention relates to a portable, hand operated water purification system. Specifically, the present invention relates to purification of water contaminated with nuclear biological, chemical and other contaminants to a level considered safe for human consumption.

BACKGROUND OF THE INVENTION

Prior portable water purification systems consist of iodine or chlorine tablets, particulate filters, iodophors, reverse osmosis filters, and various combinations of these elements. Iodine and chlorine tablets are primarily useful for treating low levels of biological contaminants. Residue from tablets results in undesirable water taste and possibly produces health side effects. Particulate filters only remove solid particles from the water. Reverse osmosis systems are primarily designed to address desalination.

Although more extensive systems which remove a broad range of contaminants exist, such systems are extremely large, not portable and require significant outside energy inputs.

The pumping means for these prior systems generally consists of simple plunger or piston-type pumps, diaphragm-type pumps, and complex regenerative piston or diaphragm pumps. In these pump mechanisms, the regenerative fluid is fed directly onto the backside of the pump piston or diaphragm. Thus, the force regeneration, and, thus, the ratio of permeate to concentrate, from the reverse osmosis filter, is always linear. Also, prior pumps include a mechanical dwell in the piston or diaphragm motion during directional valve actuation as an essential mechanical function. However, this dwell introduces a fluctuating force requirement to the pump handle or lever. Furthermore, numerous seals and springs in prior pumps are in direct contact with concentrated brine, which can lead to a buildup of contaminants on the surfaces and rapid aging or failure. In addition, the concentrated brine of the reverse osmosis filter is in direct contact with the pump cylinder and separated from the feed water by a moving seal between the piston and cylinder wall. This arrangement can lead to cross-contamination when dealing with nuclear, biological or chemical contaminants.

Therefore, a need exists for a water purification system which is capable of refining water contaminated with nuclear, biological, chemical and other contaminants. Furthermore, a need exists for a lightweight, portable system which can be used for military service, emergency and disaster relief efforts, backpacking and camping, and in travel to foreign countries where the domestic water supply is substandard and contaminated. Furthermore, a need exists for a purification system which has desalination capability for use in a sea water environment.

A need also exists for a pump mechanism which can allow variable ratios of permeate to concentrate. A need exists for a pump system which reduces the level of contaminants contacting the seals and other parts of the pump. Finally, a need exists for a pump mechanism which prevents cross-contamination of feed water and concentrate.

SUMMARY OF THE INVENTION

The present invention alleviates to a great extent the deficiencies of the prior art systems by providing a pumping system which includes a feed water pumping section and a concentrate pumping section. Each respective pumping section includes a cylinder and piston. The concentrate pumping section removes concentrate from the reverse osmosis unit while the feed water pumping section is inputting feed water into the reverse osmosis unit. This arrangement allows for non-linear ratios between intake volumes and concentrate volumes during each pump cycle. Further, the system provides for physical, rather than mechanical, separation of the concentrate waste water from the feed water. Also, the system has a steady force requirement for hand pumping, which makes pumping easier. This system also reduces the level of contaminants in the concentrate which is in contact with various parts of the system.

In another aspect of the invention, a portion of the feed water is permitted to flow through the reverse osmosis unit without pressure, to flush contaminants away from the surfaces and the reverse osmosis membrane. This extends the life of the various components.

In another aspect of the invention, the system provides for enhancing the natural osmosic flow during an intake portion of the pump cycle. This results in lower pressure requirements and longer lived reverse osmosis membranes.

In another aspect of the invention, the system includes a microbial control unit for reducing biological contaminants.

In another aspect of the invention, the system includes a prefilter and postfilter, including carbon adsorption units, for further reducing the level of contaminants in the output water.

DETAIL DESCRIPTION OF THE INVENTION

Figure 1:
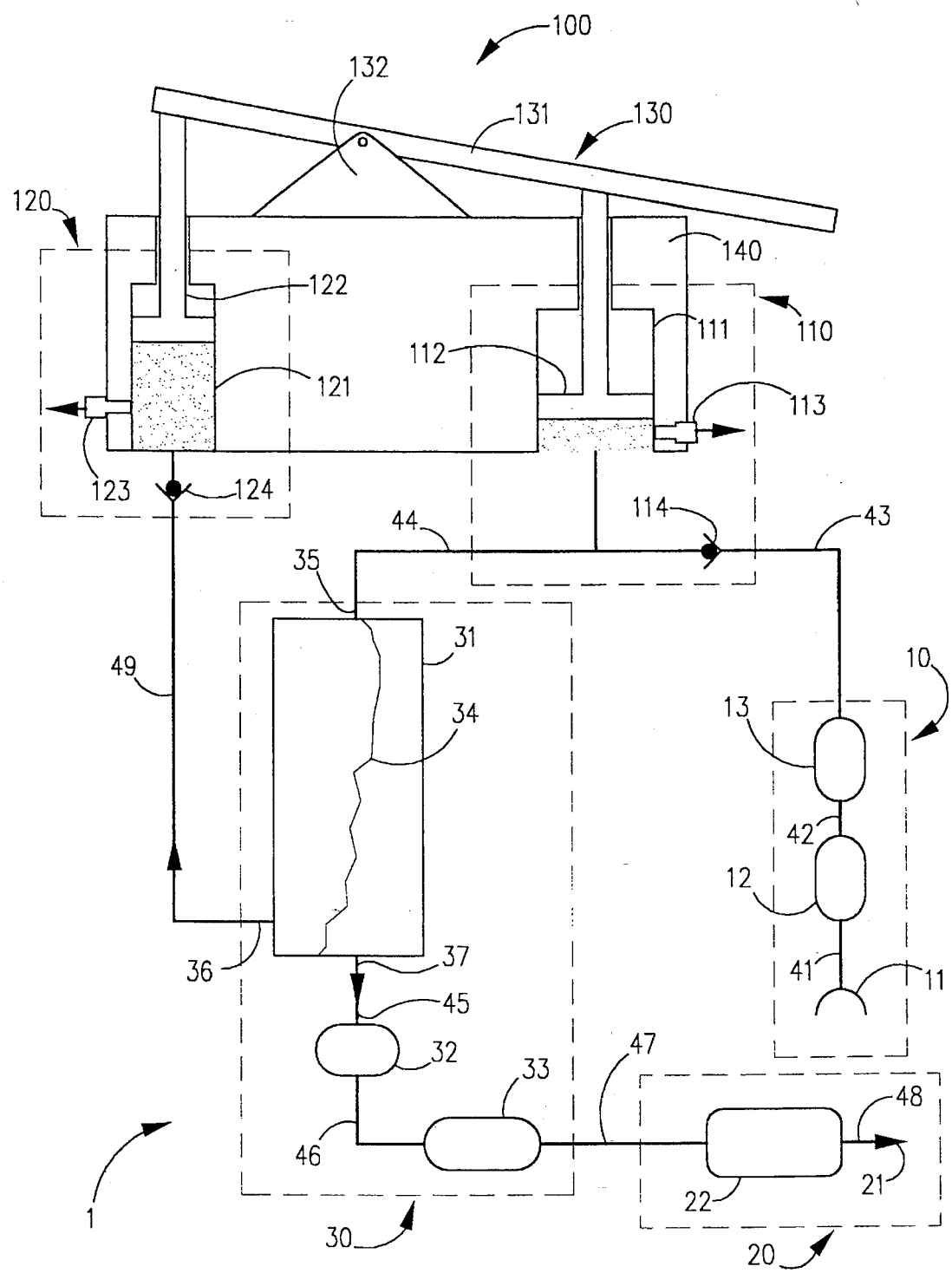
FIG. 1 is a block diagram of the components of a portable water purification system according to one embodiment of the present invention.

As illustrated in FIG. 1, the water purification system of the present invention has four principal components: (1) a prefilter 10, (2) a pumping unit 100, (3) a purification unit 30, including a reverse osmosis unit 31, and (4) a post filter 20.

The prefilter 10 has a water pickup 11 which is placed in a contaminated water source for providing feed water to the purification system. The water pickup 11 is connected to a screen filter 12 by tubing 41. Alternatively, the screen filter 12 could be located on the input opening of the water pickup 11. Screen filter consists of a fine mesh fabric of either metallic, synthetic or natural fibers. The screen filter 12 is intended to protect a first carbon element 13 from clogging with larger particles, or massive amounts of smaller particles. The screen filter 12 can be removable to facilitate cleaning. A first carbon adsorption filter 13 follows the screen filter 12 and reduces the organic and particulate contaminant load prior to the water entering the pump and reverse osmosis unit. The first carbon adsorption filter 13 can be made of either granulated carbon or, preferably, block carbon. It can be made of a singular type of carbon or from a mixture of carbon types. It can be tailored for removal of a specific contaminant type, or a broad spectrum of contaminants.

Preferably, the pre-filter 10, including the water pickup 11, the screen filter 12, and the carbon adsorption filter 13 are enclosed in a single housing (not shown). The housing can be provided with the proper buoyancy to suspend the water pickup 11 below surface contamination on the water source.

The pumping unit 100 is a double cylinder pump having a feed water pumping section 110 and a concentrate pumping section 120. The feed water pumping section 110 consists of a feed water cylinder 111 and a corresponding feed water piston 112. The pre-filter 10 is connected to the feed water cylinder 111 via a feed water pickup tube 43. The feed water cylinder is also connected to the feed water input 35 of the reverse osmosis unit 31 via feed water input tube 44. A feed water check valve 114 controls the water flow through the feed water pickup tube and the feed water input tube upon operation of the pump. A pressure relief valve 113 is also connected to the feed water cylinder 111 to release excess pressure which can be caused by improper operation or clogging of the system. The concentrate pumping section 120 also consists of a concentrate cylinder 121 and a corresponding concentrate piston 122. The concentrate cylinder 121 is connected to the concentrate output 36 of the reverse osmosis unit 31 via concentrate output tube 49. A concentrate check valve 124 controls the flow of concentrate from the reverse osmosis unit 31 to the concentrate cylinder 121. A concentrate exiting valve 123 operates to expel the concentrate from the concentrate cylinder 121 and from the system.

The arrangement of the feed water cylinder and piston and the concentrate cylinder and piston are such that the volume of the feed water cylinder 111 is greater than the volume of the concentrate cylinder 121. The difference in volumes between the two cylinders is the recovery volume or the amount of water purified by the system in each pump cycle.

As shown in FIG. 1, the pumping control section 130, which operates the feed water piston 112, and the concentrate piston 122, consists of a pump handle 131 and a pump fulcrum 132. The feed water piston 112 and the concentrate piston 122 are connected to the pump handle 131 on opposite sides of the pump fulcrum 132. Upon operation of the pump handle 131, the feed water piston and the concentrate piston operate in opposite directions. The pumping control section 130 can consist of any arrangement of levers, toggles, cams, gears and/or other machine elements to couple the feed water piston 112 and the concentrate piston 122 and to provide a motive force. The water purification system of the present invention is intended to be operated by hand, however, any other force for operating the pump can be used.

The purification unit 30, consists of a reverse osmosis unit 31, a second carbon adsorption filter 32 and a microbial control unit. The reverse osmosis unit 31 is of an ordinary type having a housing, a feed water input 35, a concentrate output 36, and a permeate output 37. A reverse osmosis membrane 34 removes contaminants from the feed water as it passes through the membrane under pressure to the permeate output 37. The reverse osmosis membrane 34 is preferable of the spiral wound type. The reverse osmosis unit, depending on the type of membrane used, serves to remove up to 99% of mono and polyvalent ions, particles, microorganisms, and organics 300 molecular weight and larger.

The microbial control unit 33 is preferably an iodine loaded ion exchange resin type of idophor. However, other types of idophors can work equally as well. Also, a different type of microbial-control device or chemical, such as calcium chloride or other "slow releasing" type biocide which is suitable for use in potable water may be used. A second carbon adsorption unit 32 is connected via tubing 45, 46 between the permeate output 37 of the reverse osmosis unit 31 and the microbial control unit 33. The second carbon adsorption filter 32 can be made from either granulated carbon or block carbon. It should be of a type suitable to readily adsorb the chemicals used in the microbial control unit 33. The primary purpose of this filter is to protect the reverse osmosis membrane from any harmful effects that could be caused by the microbial control unit.

The post filter 20 includes a water outlet 21 and a third carbon adsorption filter 22. The third carbon adsorption filter 22 also can be made from either granulated carbon or block carbon. It can be made from a singular type of carbon or from a mixture of carbon types which can be tailored for removal of a specific contaminant type or a broad spectrum of contaminants. The third carbon adsorption filter 22 is primarily to eliminate or significantly reduce any organic contaminant that remains in the water after passing through the prefilter 10 and purification unit 30. The third carbon adsorption filter 22 also removes or significantly reduces any residual chemicals introduced by the microbial control unit. The water outlet 21 serves to direct the water from the system to its point of use or storage. The post filter is connected to the microbial control unit of the main purification unit via post filter tube 47.

Upon operation, feed water is drawn into the feed water cylinder 111 through the prefilter 10 and feed water pickup tube 43 by activation of the feed water piston 112. This is referred to as the intake portion of the pump cycle.

A pressure portion of the pump cycle begins upon reversal of the direction of motion of the feed water piston 112 within the feed water cylinder 111. The feed water is passed from the feed water cylinder 111 into the reverse osmosis unit 31 through the feed water input 35 and input tube 44. Water is also drawn from the reverse osmosis unit into the concentrate cylinder 121 by operation of the concentrate piston 122 in the opposite direction of the feed water piston 112 during the pressure portion of the pump cycle. However, because the volume of the concentrate cylinder 121 is less than the volume of the feed water cylinder 111 the pressure within the system quickly increases to the point that the osmotic pressure of the feed water (approximately 10 psi for every 1,000 ppm of dissolved solids in the feed water) is exceeded. As the osmotic pressure is exceeded, a portion of the feed water begins to permeate the reverse osmosis membrane 34, thereby removing contaminants. As the pressure cycle of the pump continues, contaminant concentration increases on the feed water side of the reverse osmosis membrane 34. This concentrate, with higher concentrations of contaminants, is removed from the reverse osmosis unit 31 and away from the membrane 34 by the flow of fluid into the concentrate cylinder 121.

As the feed water piston 112 and the concentrate piston 122 approach their final position in the pressure cycle, the concentrate exiting valve 123 opens. This allows the final portion of the feed water to flow unpressurized through the reverse osmosis unit and flush concentrate away from the reverse osmosis membrane 34. Removal of concentrate from the reverse osmosis membrane prevents clogging and extends its useful life.

In addition, as the next intake portion of the pump cycle begins the movement of the feed water piston 112 creates a vacuum on the feed water side of the reverse osmosis membrane 34. The amount and duration of this vacuum is determined by the force required to overcome the cracking pressure of the feed water check valve 114 and the suction lift required to move water from the prefilter into the pump. During this period of partial vacuum the water on the permeate side of the reverse osmosis element membrane 34 travels by natural osmosis, supplemented by the partial vacuum, through the reverse osmosis membrane 34. This permeate flow purges the membrane pores and reduces the concentration of contaminants in direct contact with the membrane. This further extends the useful life of the membrane.

The concentrate exiting valve 123 remains open during the intake portion of the pump cycle, thereby, purging the concentrate cylinder of the concentrate. Concentrate check valve 124 prevents concentrate from flowing back to the reverse osmosis unit 31. At the end of the intake portion of the pump cycle, the concentrate exiting valve closes and the pressure portion of the cycle is ready to begin again.

Although preferred embodiments are specifically illustrated and described herein, it will be appreciated that modifications and variations of the present invention are covered by the above teachings and within the preview of the appended claims without departing from the spirit and intended scope of the invention.

What is claimed is new and desired to be protected by Letters Patents to the United States is:

1. A portable water purification system comprising:

a prefilter means connectable to a feed water source;

a pump system immediately connected to said prefilter means;

a reverse osmosis filter means connected to said pump system, said reverse osmosis filter means including an input means, permeate output means, and a concentrate output means;

a microbial control means connected to said permeate output means; and a post filter means connected to said microbial control means; and wherein said prefilter means includes:
      a water pickup means connected to said feed water source for obtaining feed water from said feed water source;
      a screen filter means connected to said water pickup means; and
      an adsorption filter means connected to said screen filter means, wherein said adsorption filter means is connected to said pump system.

2. The portable water purification system of claim 1, wherein said pump system includes:

a feed water pumping section for inputting feed water to said input means; and a concentrate pumping section for removing concentrate from said concentrate output means.

3. A portable water purification system comprising:

a prefilter means connectable to a feed water source;

a pump system immediately connected to said prefilter means;

a reverse osmosis filter means connected to said pump system, said reverse osmosis filter means including an input means, permeate output means, and a concentrate output means;

a microbial control means connected to said permeate output means; and a post filter means connected to said microbial control means; and wherein said microbial control means includes:
      an adsorption filter means connected to said permeate output means; and
      a microbial control device connected to said adsorption filter means and to said post filter means.

4. The portable water purification system of claim 3, wherein said post filter means includes a carbon adsorption filter means.

* * * * *